Figure 1:
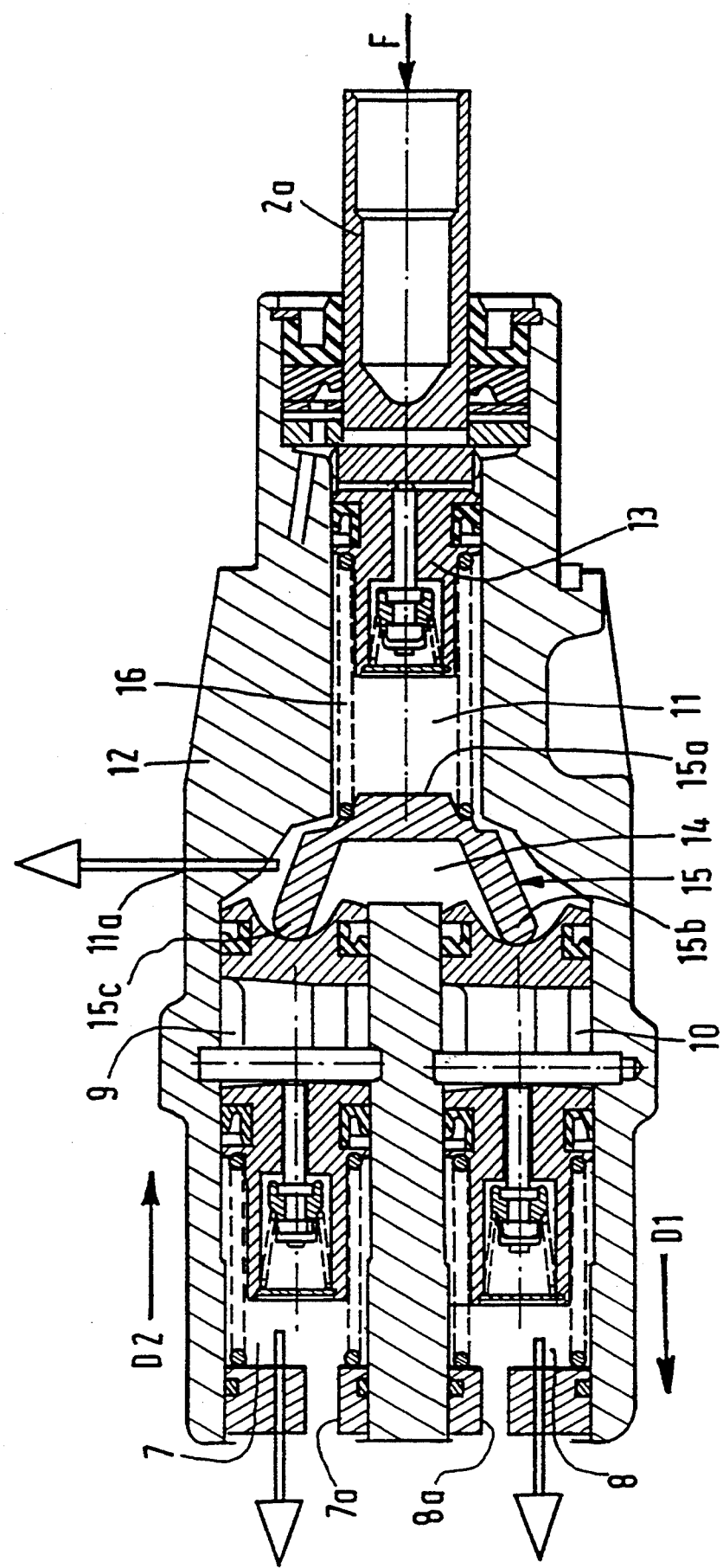

United States Patent [19]

Castel

[11] Patent Number: 5,448,888
[45] Date of Patent: Sep. 12, 1995

[54] BRAKING SYSTEM WITH THREE INDEPENDENT HYDRAULIC CIRCUITS

[76] Inventor: Philippe Castel, 8 Rue Monge, Paris, France, 75005

[21] Appl. No.: 204,245
[22] PCT Filed: Feb. 17, 1994
[86] PCT No.: PCT/FR94/00173
    § 371 Date: Mar. 7, 1994
    § 102(e) Date: Mar. 7, 1994
[87] PCT Pub. No.: WO94/20346
    PCT Pub. Date: Sep. 15, 1994

[30] Foreign Application Priority Data

Mar. 10, 1993 [FR] France ................ 93 02742

[51] Int. Cl.6 .................. B60T 11/24; B60T 11/20
[52] U.S. Cl. ........................... 60/580; 60/562
[58] Field of Search ............ 60/562, 579, 580, 581; 303/6.01, 9.63, 9.75

[56] References Cited

U.S. PATENT DOCUMENTS

| | | | |
|---|---|---|---|
| 1,986,764 | 1/1935 | Rhodes | 60/580 |
| 2,249,227 | 7/1941 | Press | 60/581 X |
| 2,762,199 | 9/1956 | Major | 60/580 |
| 3,040,534 | 6/1962 | Hager | 60/580 X |
| 3,393,510 | 7/1968 | Kinsey | 60/580 |
| 4,604,870 | 8/1986 | Bach et al. | 60/581 X |
| 5,070,699 | 12/1991 | Leiber et al. | 60/581 |

FOREIGN PATENT DOCUMENTS

| | | |
|---|---|---|
| 2535270 | 5/1984 | France . |
| 2213944 | 11/1972 | Germany . |
| 2415133 | 10/1974 | Germany . |

*Primary Examiner*—John E. Ryznic
*Attorney, Agent, or Firm*—Larry J. Palguta; Leo H. McCormick, Jr.

[57] ABSTRACT

A master cylinder having first and second pressure chambers located parallel to each other and having first and second pistons, respectively, for pressurizing the parallel chambers and supplying pressure fluid to first and second brakes, and a third chamber with a third piston, the third piston being driven by an input shaft to the master cylinder for pressurizing the third chamber, the third chamber being connected to a third brake and to the first and second pistons of the parallel chambers, where the third piston abuts a balance arm which is connected to the first and second pistons for manual operation of the two pistons when a loss of pressure in the third chamber results.

5 Claims, 2 Drawing Sheets

BRAKING SYSTEM WITH THREE INDEPENDENT HYDRAULIC CIRCUITS

This application is a Rule 371 of PCT/FR94/00173 filed on Feb. 17, 1994.

The present invention relates to a braking system of a motor vehicle, including a master cylinder intended to constitute a high-pressure source for a hydraulic fluid with which it is filled for the purpose of supplying brake motors, this master cylinder comprising first and second pressure chambers located parallel to each other and provided with first and second respective pressure outlets adjacent to one another, these chambers being essentially made up of respective cylinders in which there are housed respective pistons intended to slide simultaneously, in a first direction pointing towards the first and second outlets, to make pressures which increase simultaneously appear on these outlets.

Such braking systems are used in the prior art, the master cylinders of the type mentioned being known under the specific denomination of "parallel-master cylinders".

More generally, multiple braking circuits have been known for a long time and appreciated for the guarantees which they offer in matters of safety, compared with single-line brake systems, which any loss in hydraulic fluid may render totally inoperative.

Amongst the multiple circuits known, the most widely used are the so-called "X-split" and "front/rear-split" systems, the first being formed by two sub-circuits each of which provides braking on one diagonal of the vehicle, and the second being formed by two sub-circuits one of which provides braking on the front axle and the other on the rear axle.

Insofar as the choice of one or other of these known systems obviously results in various comprises, particularly ones of economics, each of the systems exhibits specific advantages and drawbacks.

In particular, since the braking force of a vehicle is much greater at the front than at the rear, failure of the front sub-circuit of a "front/rear-split" configured braking system impairs the braking qualities of the vehicle far more than the failure of one of the subcircuits of an "X-split" configured system.

In contrast, the stability of the vehicle is less compromised in the first case, and a "front/rear-split" configured system exhibits the additional advantage of requiring just one device for distributing the braking pressures between the front and the rear.

Document DE-A-2,415,133 discloses a master cylinder with three parallel chambers, capable of being associated with a hybrid braking circuit exhibiting the cumulated advantages of "X-split" and "front/rear-split" circuits.

However, this known master cylinder exhibits the disadvantage of requiring four pistons, of having a large diameter right from its input, practically preventing it from being associated with a pneumatic booster, and of having high structural complexity and high weight.

The present invention is situated within this context, and proposes to improve the existing braking systems by means of a novel type of master cylinder capable of being produced at a relatively low cost.

To this end, the braking system of the invention is essentially characterized in that this master cylinder which it includes further comprises a third chamber essentially made up of a third cylinder parallel to the first two and extending them in a second direction opposite the first one, this third chamber comprising a third pressure outlet connected to at least one brake motor, a third piston capable of sliding in the first direction, under the effect of an input force, in order to make the pressure on this third outlet increase, and means for transmitting at least part of the input force to the first and second pistons, these force-transmission means comprising at least one communication between the third chamber and the first two, allowing the fluid present in the third chamber to act hydraulically on the first and second pistons by pushing them in the first direction.

In order to increase the operational safety of the master cylinder, the force-transmission means preferably also comprise a balance arm having a base and two branches like a U or a V, this balance armbearing on the first and second pistons via respective ends of its branches, and being capable of being pushed by the third piston which comes directly into contact with its base, at least in the event of a lack of fluid in the third chamber.

The three chambers are, for example, formed in one same body, and a spring working in compression is located between the balance arm and the third piston.

In a braking system which comprises two front brake motors and two rear brake motors, and which uses such a master cylinder, the output of the first chamber is preferably connected to the first front brake motor, whereas the outlet of the second chamber is connected to the second front brake motor, and the outlet of the third chamber is simultaneously connected to each of the rear brake motors.

Figure 2:
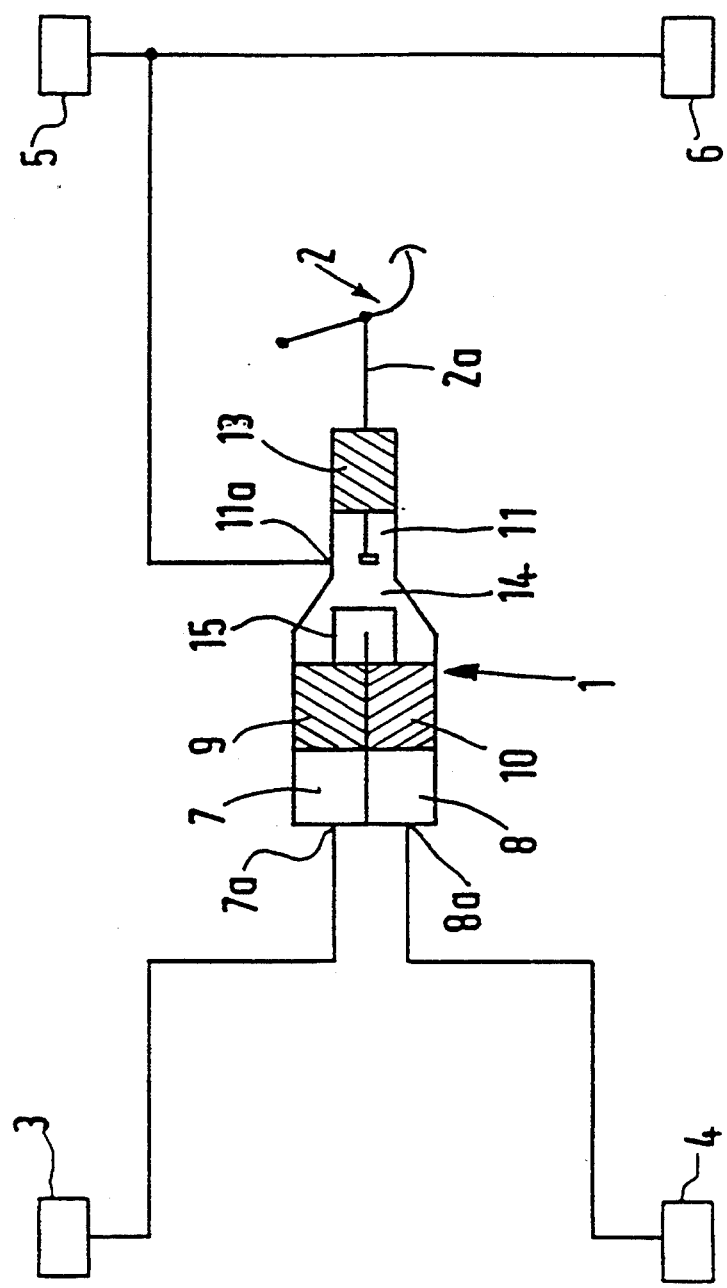

Other features and advantages of the invention will emerge clearly from the description thereof which is given hereafter by way of non-limiting example with reference to the appended drawings in which:

FIG. 1 is a sectional view of a master cylinder equipping a brake system in accordance with the invention; and FIG. 2 is a diagram for connecting this master cylinder into such a system.

The braking system of the invention includes a master cylinder 1 actuated by means of a pedal 2 via the action of a rod 2a, and intended to constitute a high-pressure source for a hydraulic fluid with which it is filled, for the purpose of supplying front brake motors 3, 4 and rear brake motors 5, 6 of a motor vehicle.

This master cylinder comprises first and second pressure chambers 7, 8 arranged parallel to one another and provided with respective first and second pressure outlets 7a, 8a adjacent to one another.

These chambers are essentially made up of respective cylinders in which there are housed respective pistons 9, 10 intended to slide simultaneously, in a first direction D1 pointing towards the first and second outlets 7a, 8a, to make there appear on these outlets pressures which increase simultaneously.

This master cylinder further comprises a third chamber 11, essentially made up of a third cylinder parallel to the first two, extending them in a second direction D2, opposite the first, and formed in one same body 12 as the first two cylinders 7, 8.

The third chamber 11 comprising a third pressure outlet 11a, a third piston 13 capable of sliding in the first direction D1, under the effect of an input force F applied to the rod 2a so as to make the pressure on this third outlet 11a increase, and means for transmitting at least a part of the input force F to the first and second pistons 9, 10.

These force-transmission means preferably comprise hydraulic means and mechanical means and, more precisely, a passage 14 putting the third chamber in communication with the first two in order to allow the fluid present in this chamber to act hydraulically on the first and second pistons by pushing them in the first direction D1, as well as a balance arm 15 having a base 15a and two branches 15b, 15c, like a U or a V.

This balance arm, which acts mechanically, bears on the first and second pistons 9, 10 via the respective ends of its branches, and is capable of being pushed by the third piston 13 which comes into direct contact with its base 15a and pushes it in the first direction D1 when the hydraulic fluid is accidentally missing from the third chamber following a leak in the brake system, this balance arm then in turn actuating the first and second pistons.

The base of the balance arm is, for example, shaped so as to receive a spring 16 working in compression and located between this balance arm and the third piston 13.

As shown in FIG. 2, the outlet 7a of the first chamber may be connected to the first front brake motor 3, the outlet 8a of the second chamber may be connected to the second front brake motor 4, and the outlet 11a of the third chamber may simultaneously be connected to each of the two rear brake motors 5 and 6.

By virtue of such an arrangement, of relatively simple construction, the negative consequences of a failure on any one of the front left, front right or rear hydraulic braking circuits remain very limited.

In particular, a failure of any one of the front circuits only very slightly impairs the braking capability and the stability of the vehicle, particularly insofar as the braking still remains symmetrically provided on the two rear wheels and on one front wheel.

Moreover, a failure on the rear circuit, although it involves two wheels, remains benign because braking is still provided on the front axle assembly, on which the greatest forces are always applied, and the stability of the vehicle benefits from the total symmetry of the residual braking forces.

I claim:

1. A braking system of a motor vehicle, including a master cylinder providing a high-pressure source for a hydraulic fluid supplied to brake motors, the master cylinder comprising first and second pressure chambers located parallel to one another and provided with adjacent respective first and second pressure outlets, the chambers comprising cylinders in which are housed respective first and second pistons intended to slide simultaneously in a first direction toward the first and second pressure outlets to effect pressures which increase simultaneously at the pressure outlets, characterized in that the master cylinder further comprises a third pressure chamber comprising a third cylinder parallel to the first and second pressure chambers and extending in a second direction which is opposite the first direction, a third pressure outlet of the third chamber connected to at least one brake motor, a third piston capable of sliding in the first direction under the effect of an input force in order to increase the pressure at the third pressure outlet, and means for transmitting at least part of the input force to the first and second pistons, the force-transmitting means comprising at least one communication between the third pressure chamber and the first and second pressure chambers and which allows fluid in the third pressure chamber to act hydraulically on and displace the first and second pistons in the first direction.

2. The braking system according to claim 1, characterized in that the force-transmitting means comprises a balance arm having a base and two branches shaped like one of a U and a V, the balance arm bearing on the first and second pistons via respective ends of the branches and capable of being pushed by the third piston which comes directly into contact with the base at least in the event of a lack of fluid in the third pressure chamber.

3. The braking system according to claim 2, characterized in that a compression spring is located between the balance arm and the third piston.

4. The braking system according to claim 1, characterized in that the three pressure chambers are formed in one body.

5. The braking system according to any one of the preceding claims, characterized in that the system comprises two front brake motors and two rear brake motors, the first outlet of the first pressure chamber connected to the one front brake motor and the second outlet of the second pressure chamber connected to the other front brake motor, and the third outlet of the third pressure chamber connected simultaneously to each of the rear brake motors.

* * * * *